United States Patent [19]

Belanger et al.

[11] Patent Number: 4,794,060
[45] Date of Patent: Dec. 27, 1988

[54] DENSE ANODES OF LITHIUM ALLOYS FOR ALL SOLID BATTERIES

[75] Inventors: André Belanger; Michel Robitaille, both of Sainte-Julie, Canada

[73] Assignees: Hydro-Quebec; Societe Nationale Elf Aquitaine, both of Quebec, Canada

[21] Appl. No.: 937,883

[22] Filed: Dec. 4, 1986

Related U.S. Application Data

[62] Division of Ser. No. 714,394, Mar. 21, 1985, Pat. No. 4,652,506.

[30] Foreign Application Priority Data

Nov. 4, 1984 [CA] Canada ............................ 451783

[51] Int. Cl.[4] .......................................... H01M 4/02
[52] U.S. Cl. .................................. 429/209; 429/218; 429/191; 252/182.1
[58] Field of Search ............... 429/218, 191, 209, 192; 252/182.1; 428/606, 607; 420/400, 402, 528, 557

[56] References Cited

U.S. PATENT DOCUMENTS

| | | | |
|---|---|---|---|
| 4,495,258 | 1/1985 | Mehaute et al. | 429/218 X |
| 4,517,265 | 5/1985 | Belanger et al. | 429/217 |
| 4,587,182 | 5/1986 | Stiles et al. | 429/218 X |
| 4,589,197 | 5/1986 | North | 429/217 X |

Primary Examiner—Anthony Skapars
Attorney, Agent, or Firm—Oblon, Fisher, Spivak, McClelland & Maier

[57] ABSTRACT

The disclosure describes an anode made of a thin metallic foil in discharged condition which is converted into a dense metallic alloy of an alkali metal during the first charge. The disclosure also describes an electrochemical rechargeable battery in discharged condition. The latter comprises an anode made of a thin metallic foil, such as aluminum, magnesium or tin, an electrolyte, for example a polymeric electrolyte, as well as a cathode based on an oxide, a sulfide or an halide, prepared in discharged condition and constituting a source of alkali metal preferably lithium. The cathode should be capable of freeing the alkali metal under a charge so that the latter is introduced into the metallic foil to form an alloy of the alkali metal and of at least a portion of the metal consitituting the metallic sheet. To obtain the charged batery, it is merely sufficient to apply a charge during a certain period of time while the anode is being transformed into an alloy. Substantially improved properties during cycling.

15 Claims, 4 Drawing Sheets

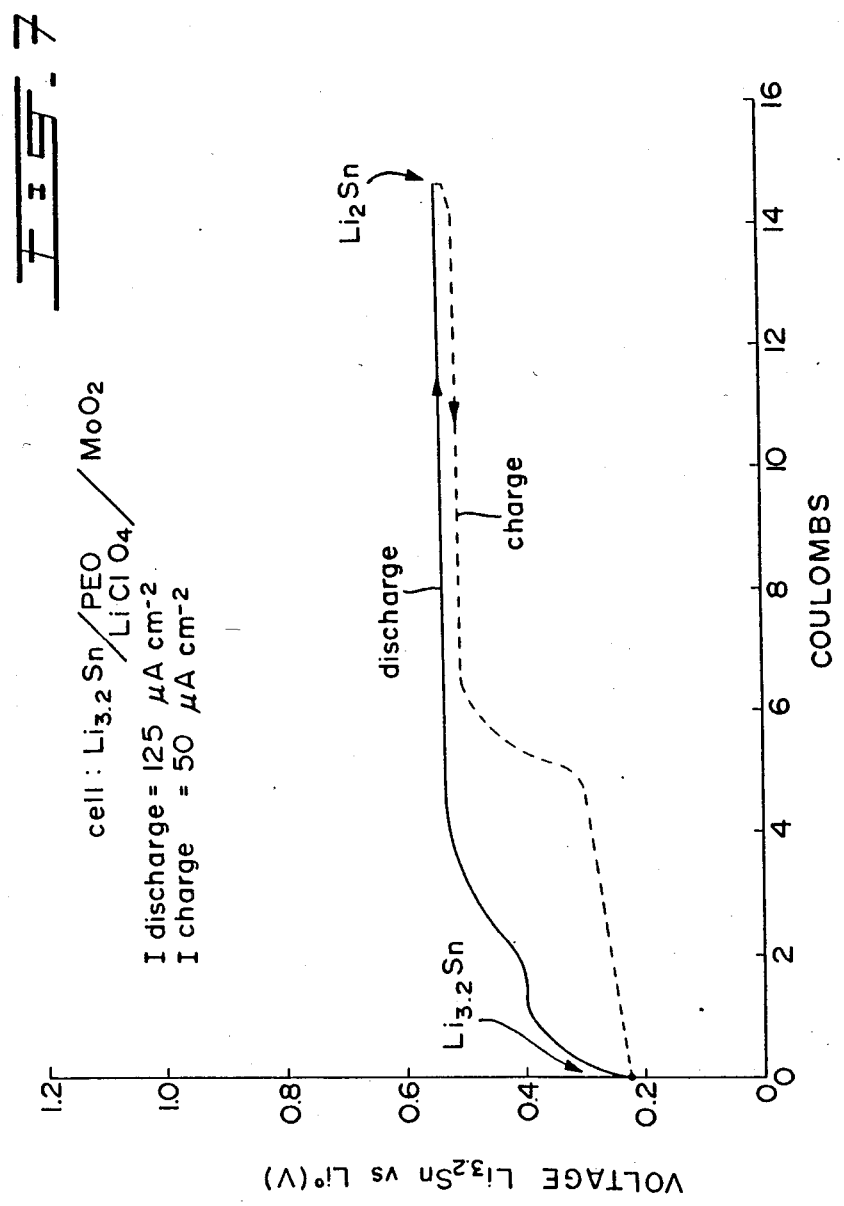

DENSE ANODES OF LITHIUM ALLOYS FOR ALL SOLID BATTERIES

This is a division of application Ser. No. 714,394, filed Mar. 21, 1985, now U.S. Pat. No. 4,652,506.

BACKGROUND OF INVENTION (a) Field of the Invention

The invention concerns dense anodes of alloys of alkali metals, such as lithium for rechargeable batteries, preferably all solid. More specifically, the invention relates to discharged or partially discharged electrochemical rechargeable batteries as well as a method for the preparation of charged electrochemical rechargeable battery including a dense anode of an alloy of alkali metal, such as lithium.

(b) Description of Prior Art

The development of lithium rechargeable batteries which operate at low temperature is dependent on the design of lithium anodes which are sufficiently stable and reversible. With organic media ($LiClO_4$ in propylene carbonate) or solid electrolytes ($Li_3N$ or polyether-lithium salt complexes), the lithium electrode represents the component of a cell battery which fails most often because of the passivation of the electrode and the formation of surface dendrites. This phenomenon seriously limits the useful life of the battery.

Passivation is essentially due to a problem of thermodynamic instability of lithium with respect to some functional groups such as C-O, C=O, C-OH, etc ... which provokes corrosion reactions with accumulation of reaction products at the interface. These products prevent any dense and uniform deposit of lithium. The dendrites appear during the recharge when a number of experimental parameters contribute to their formation: low temperature, high currents of recharge, passivated and rough surface, presence of asperities, etc . . . .

The use of lithium alloys whose chemical activity is lower than that of lithium, enables to eliminate most of the problems bound to the dendritic growth. Most of the alloys which are interesting from an electrochemical point of view (e.g. LiAl 50% at.) are fragile and brittle and thus are available in the form of powder. This lithium alloy powder can be used for the preparation of thin films of composite materials which are well suited for batteries operating with polymeric electrolytes, such as described in French patent applications of Michel Ammand and Michel Duclot Nos. 78.32976, 78.32977 and 78.32978, now published under Nos. 2442512, 2442514 and 2442513, as well as U.S. Ser. No. 430,696 filed on Sept. 30, 1982 in the name of Hydro-Québec.

Some alloys, such as the alloy of lithium and aluminum containing 90% at. lithium are sufficiently ductile to be laminated into thin films, but they are unacceptable because, on the one hand, their chemical potential is so close to lithium that they do not prevent dendritic growth, and on the other hand, irreversible phases of this composition are formed during cycling and are seriously harmful to the movement of lithium.

At temperatures higher than 80° C. it has often been observed that composite anodes were aging prematurely during cycling. This phenomenon can be explained by a generalized reaction of the alloy of lithium with the surrounding electrolyte. To reduce the speed of the reaction one should conceive a way in which the alloy should contact the electrolyte only by one of its plane. This implies the use of thin, compact and uniform alloys of lithium. The thinness of the film of alloy results from the fact that at temperatures in the vicinity or lower than 100° C. the coefficient of diffusion of the alkali metal in the alloy under consideration is often of the order of $10^{-9}$ $cm^2 sec^{-1}$ or lower. Therefore, to be able to utilize all the capacity of dense anodes, it is essential to rely on thin alloys. Unfortunately, these alloys are not presently commercially available.

SUMMARY OF INVENTION

In order to overcome the difficulties and disadvantages mentioned above, we have designed a dense anode constituted of a compact metallic foil alloyed with an alkali metal, characterized by a rechargeability which extends on at least 20 cycles and whose thickness varies between about $5\mu$ and $100\mu$.

We have also designed an electrochemical cell battery in discharged condition which comprises an anode made of a thin metallic foil, an electrolyte as well as a cathode based on an oxide, a sulphide or a halide prepared in discharged condition and constituting a source of alkali metal. The cathode should free at least a portion of the alkali metal under a recharge, so that the alkali metal is introduced into the metallic foil to form the compact metallic alloy of alkali metal, constituting the dense anode which is mentioned above.

The metallic foil is preferably made of a sheet of a metal selected from the group consisting of aluminum, magnesium and tin. With respect to the alkali metal, lithium is preferred.

According to a preferred embodiment of the invention, when a foil of aluminum is used and the alkali metal is lithium, the capacity of the cathode expressed in Coulombs is selected so that during the recharge carried out at a suitable intensity of current, there is obtained an alloy of the foil of aluminum and of lithium containing at least 30% at. lithium, preferably between about 30 and 40% at. lithium.

With respect to the electrolyte, a polymeric electrolyte is preferred, for example one based on polyether, preferably associated with a salt of lithium, for example $LiClO_4$.

With respect to the cathode, the nature of the latter can vary provided the alkali metal, such as lithium can be reversibly freed therefrom to be alloyed to the metal of the metallic foil. Preferably, the cathode is selected among $Li_xTiS_2$, and $Li_xMoO_2$, where $0<x<2$, and $Li_xV_6O_{13}$ where $0<x<8$.

The anode is preferably constituted of a foil of aluminum, tin or magnesium whose thickness varies between about $3\mu$ and about $50\mu$, in which case the electrolyte comprises a thin film of polyethylene oxide (PEO) and $LiClO_4$ whose thickness varies between $25\mu$ and $150\mu$, and the cathode comprises a composite electrode of $LiTiS_2$ whose thickness varies between about $25\mu$ and $100 \mu$.

In some cases, it would be interesting to slightly overdimension the negative electrode with respect to the positive electrode in order to increase the number of deep cycles which a cell battery can undergo during its active life. To do this, instead of using a metallic foil made of a pure metal, a partial colaminate of the alkali metal on the metallic foil could be used. For example, one could use a colaminate of aluminum and lithium, of tin and lithium, of magnesium and lithium, etc .... The partial colamination can also be found to be very useful in the cases where a certain portion of the lithium, recovered from the cathode, is not totally reversible in the alloy of lithium as it is the case for magnesium. For the same reason, instead of starting with a 100% aluminum foil one could use an aluminum foil in which there would be already some clusters of an intermetallic compound such as LiAl or LiAl$_3$. These clusters would supply upon recharge the necessary lithium to compensate any irreversibility. Of course, any other technique enabling to deposit an equivalent quantity of lithium on the metallic foil could be completely acceptable, such as the deposit by gaseous means. For the same purpose, a cathode in which the constituting component is oversaturated with alkali metal could also be used. For example, the cathode can be based on Li$_x$TiS$_2$, where x>1, the portion exceeding x=1 constituting the portion of lithium which is caught in the alloy, i.e. which becomes irreversible. Afterwards, the battery is reversibly cycled between Li$_1$TiS$_2$ and TiS$_2$.

In the case where the metallic foil is made of tin, the domain of reversibility of lithium will normally be found between about 0 and 3.2 Li/at. Sn (0 to 76at. Li) and in the case of magnesium, this same domain will spread to about the 1$^{st}$ to the 4$^{th}$ lithium, (50-80 at. Li).

The invention also relates to a method of preparing electrochemical rechargeable battery in charged condition including a dense anode made of a compact sheet of metal alloy with an alkali metal characterized by preparing an electrolytic cell made of a thin metallic foil intended to form the dense anode, an electrolyte and a cathode based on oxide, sulfide or halide prepared in discharged condition and constituting a source of alkali metal, and then, the alkali metal is introduced in the metallic foil until there is obtained an alloy of the metallic foil whose concentration in alkali metal enables a rechargeability of the battery spreading on at least 20 cycles.

In order that the rechargeable battery be functional, the first charge will be carried out at a current density selected so as to insure a uniform synthesis of the alloy constituting the anode. This initial charge will usually take between about 2 and 20 hours.

According to a preferred embodiment of the invention, the metallic foil, whether it be made of aluminum, magnesium or tin is mounted on a collector, which can be a thin conducting foil, which is inert with respect to the alloy, for example, copper, metallized plastic or metal grid, all with the intention to insure a good uniformity in the distribution of the potential.

According to another preferred embodiment of the invention, the metallic sheet could have some degree of porosity so as to compensate for the increase of volume which takes place during the formation of the alloy. In practice, the alkali metal which is freed by the cathode compensates for the interstices defining the porosity of the metallic foil.

BRIEF DESCRIPTION OF DRAWINGS

In the drawings which illustrate the invention:

FIG. 7 is a graph describing the behaviour of an alloy of lithium and tin formed in situ containing 3.2 parts of lithium (Li$_{3.2}$Sn).

To study the cycling properties of the dense anodes according to the invention, an experimental arrangement was prepared which reproduces the real conditions of formation of the alloy as they would be found in a rechargeable battery prepared in discharged condition.

Figure 1:
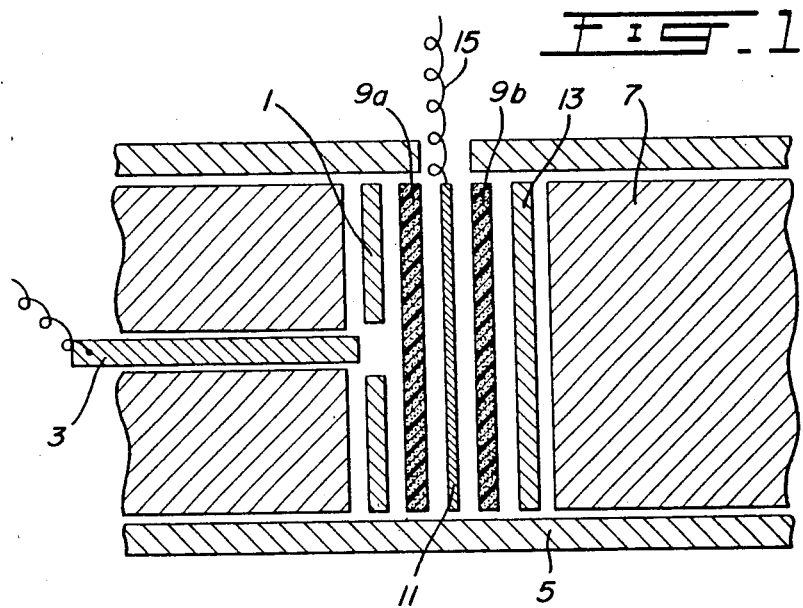
FIG. 1 illustrates an arrangement including a foil of aluminum and an auxiliary electrode which serves as a source of lithium enabling to obtain a dense anode according to the invention.

This arrangement comprises an auxiliary electrode 1 which serves as a source of lithium such as illustrated in FIG. 1. The arrangement also comprises the following elements: a lithium reference electrode 3, a cell case of boron nitride 5, and a piston-current collector 7 and 7a. Moreover, the constituting components of the cell comprise two electrolytes 9a, 9b whose thicknesses are comparable, i.e. 150μ, of PEO-LiClO$_4$, a foil of aluminum pressed on a stainless steel grid 11 provided with a wire for current connection 15 as well as a composite cathode MoO$_2$-PEO-black 13.

In this arrangement, the left cell is first used: Li metal/electrolyte/Al (1,9a, 15) to inject a given quantity of lithium in the foil of aluminum which simulates on the anode side what is taking place during the initial charge of the cell battery designed in discharged condition. Once the alloy LiAl has been synthetized, the battery LiAl/electrolyte/cathode (15, 9b, 13) is connected to follow the evolution of the electrode LiAl during cycling. Other ways of synthetizing the dense alloy could have been considered, for example, the colamination of a thin film of lithium on a foil of aluminum in proportions which enable to obtain the intended alloy by the inter-diffusion of the two elements into one another. However, in order to obtain a dense anode whose characteristics are as close as possible to those which could be found in a lithium rechargeable battery in discharged condition, the use of the arrangement illustrated in FIG. 1 has been considered to be more appropriate. One of the advantages of this arrangement also resides in the fact that it enables to come back, if needed, to the left battery to progressively increase the quantity of lithium of the foil of aluminum. It is then possible to compare the reversibility of many compositions of dense alloy LiAl and to identify the one which possesses the best performances when used in a rechargeable battery. Of course, a similar and/or equivalent arrangement could be prepared by replacing the aluminum by foils of magnesium or tin.

Figure 2:
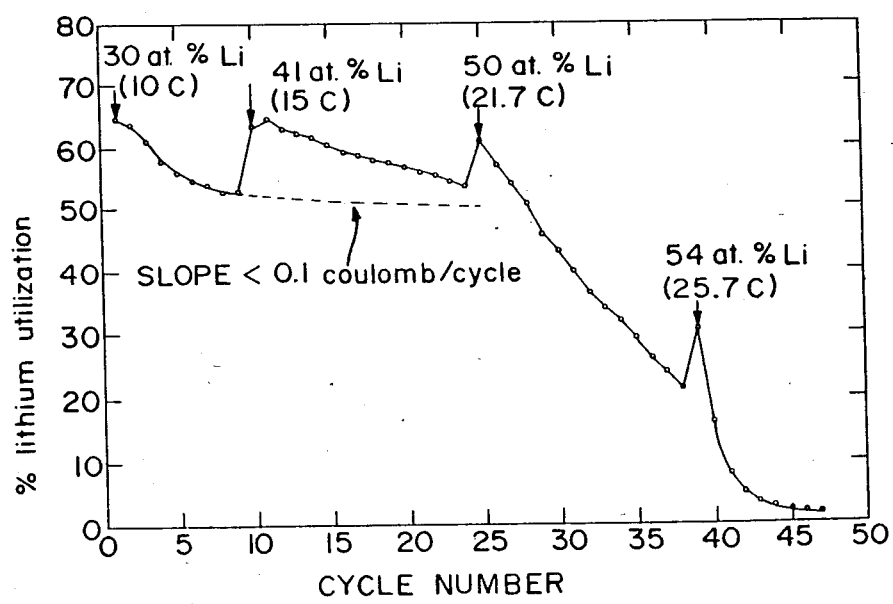
FIG. 2 is a graph illustrating the decreasing rhythm of the lithiun utilization of various LiAl alloys during cycling as a function of their lithium content.

Cycling tests were made in the case of LiAl alloy and the experimental results are given in FIG. 2. This Figure illustrates the behaviour during cycling of a foil of aluminum charged with 30, 40, 50 and 54% at. of lithium. In particular, the behaviour at 30% at. Li is very significant. In this precise case, the lithium utilization of the electrode falls at a rhythm lower than 0.1 coulomb/cycle, as indicated in the dotted line of FIG. 2 obtained in an identical arrangement which has been also cycled at 30% at. for more than 20 cycles. This decrease is low with respect to other compositions depicted on FIG. 2 and also with respect to a composite electrode containing 40% VOL of LiAl (50% at. Li)+20% VOL of black+40% PEO wherein the utilization falls at a rhythm higher than 1 coulomb/cycle.

The dense alloy so prepared at 30% at. lithium has energetic characteristics which advantageously compare to LiAl-black-PEO composite anodes. So, by taking only the active materials into account, the following data are obtained for an anode/TiS$_2$ battery.

|  | Mass Energy (Wh kg$^{-1}$) | Voluminal Energy (Whl$^{-1}$) |
|---|---|---|
| LiAl dense | 236 | 644 |
| LiAl composite | 232 | 451 |
| Li metallic | 545 | 1121 |

The composition of the alloy has a definite importance. For example, in the case of LiAl, an alloy containing less than 30% at. Li would give a density of energy which is insufficient, because it is lower than 200 Wh kg$^{-1}$. Similarly, for higher contents at 40% at. Li the rate of decrease of the utilization during cycling increases seriously to reach 0.6 coulomb/cycle in the vicinity of 50% at. Li in aluminum (see FIG. 2). This example therefore shows the importance of selecting very specifically the composition of the alloy to optimize the performances.

In practice, the rechargeable battery will be built in discharged condition and for the sake of demonstration, we have prepared the following arrangement:

cathode: LiTiS$_2$ (43% VOL LiTiS$_2$- 17% VOL graphite - 40% VOL PEO) - area 3.8 cm$^2$ - thickness 75$\mu$;

electrolyte: PEO-LiClO$_4$-150$\mu$;

anode: foil of aluminum mounted on a stainless steel grid 40Q mesh, thickness 16$\mu$, area 3.8 cm$^2$.

The tests were carried out at 100° C. The battery was cycled at a charge current equal to 50 $\mu$Acm$^{-2}$ during recharge and 125 $\mu$Acm$^{-2}$ during discharge.

During the first charge, 28 of the 30 Coulombs have been withdrawn from LiTiS$_2$ (cathode) to form the alloy on the anode side. Then, during cycling, more than 22 Coulombs have been cycled in a reversible manner on more than 30 cycles, which represents a performance which is equivalent to the tests made with the arrangement of FIG. 1.

This test confirms that the experimental arrangement which simulates the construction in discharged condition and illustrated in FIG. 1 is perfectly acceptable.

When prepared in discharged condition, the battery has an increased "shelf-life" since its potential in open-circuit is generally lower than 0.5 volt (e.g. LiTiS$_2$—Al).

Handling of LiTiS$_2$ also requires less demanding surroundings than to handle LiAl alloys. The arrangement can be prepared in dry air instead of an inert gas such as argon or helium. Another advantage: the in situ synthesis of the LiAl alloy also decreases the risks of degradation and of passivation of the negative interface during the various handlings carried out during the cell assembly.

The excellent performance during cycling of the LiAl alloy at 30% lithium is due to the fact that at this concentration, the original network remains somewhat intact without deep pulverization of the medium, which would result in an acceleration of the degradation of the interface and an increase of the resistivity of the negative electrode by multiplying the resistive contacts between particles.

FIG. 2 shows a graph describing the rhythm of decline of the use of various alloys LiAl during cycling as a function of their lithium content. One can see the excellent behaviour of the compact alloy of LiAl at 30% at. characterized by a utilization which is stabilized after 4 or 5 cycles as compared to higher rhythms at 41%, 50% and 54%.

Figure 3:
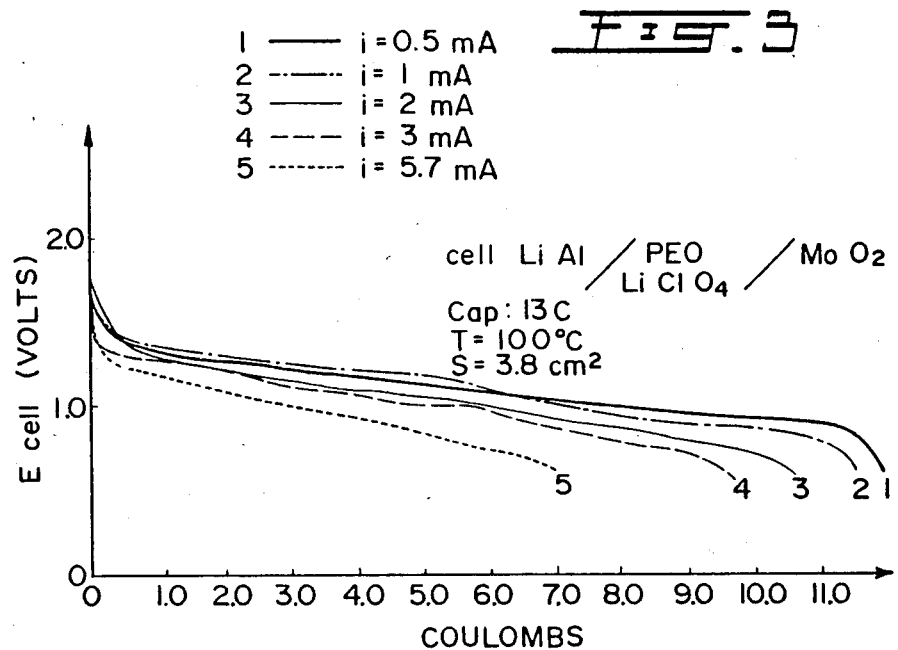
FIG. 3 is a graph showing the discharge curves obtained on a LiAl/MoO$_2$ cell at 100° C. for different current densities.

In the same manner, FIG. 3 shows discharged curves obtained on an arrangement LiAl/MoO$_2$ at 100° C. for different current densities. The performances of the dense electrode LiAl are especially interesting at 100° C. where utilizations exceeding 55% of the anode are obtained at 1.5 mAcm$^{-2}$ during discharge. By comparison, a composite LiAl electrode under the same experimental conditions gives an utilization of 30% at 0.5 mAcm$^{-2}$ for a composition of LiAl (50% at. Li) 35 VOL %+20 VOL % of acetylene black+45 VOL % of PEO.

Tests were also carried out on metallic foils of magnesium and tin.

The fact that the first lithium alloying with magnesium is not reversible excludes the possibility of considering an arrangement in discharged mode as in the case of aluminum. This loss should be compensated by means of an experimental short cut such as the deposition (evaporation or colamination) of a corresponding quantity of lithium on the anode or an oversaturation of the cathodic compound inserted with lithium (Li$_x$TiS$_2$ with x$\approx$1.3). According to the arrangement of FIG. 1, a cell battery was prepared by using a dense alloy of lithium and magnesium. The foil of magnesium of a thickness of 5$\mu$ (3.4 mg) has been mounted on a stainless steel grid. The electrolyte is constituted of a membrane of PEO-LiClO$_4$ 150$\mu$ while the cathode is a composite electrode MoO$_2$-black-PEO whose thickness is 90$\mu$.

Starting with the auxiliary electrode of lithium 1, the sheet of magnesium was transformed to a dense alloy of composition Li$_3$Mg. To reach this composition the charge required was 40.5. More than 25 Coulombs were reversibly cycled, which corresponds to the cycling between LiMg and Li$_3$Mg, the first lithium being irreversible.

Figure 4:
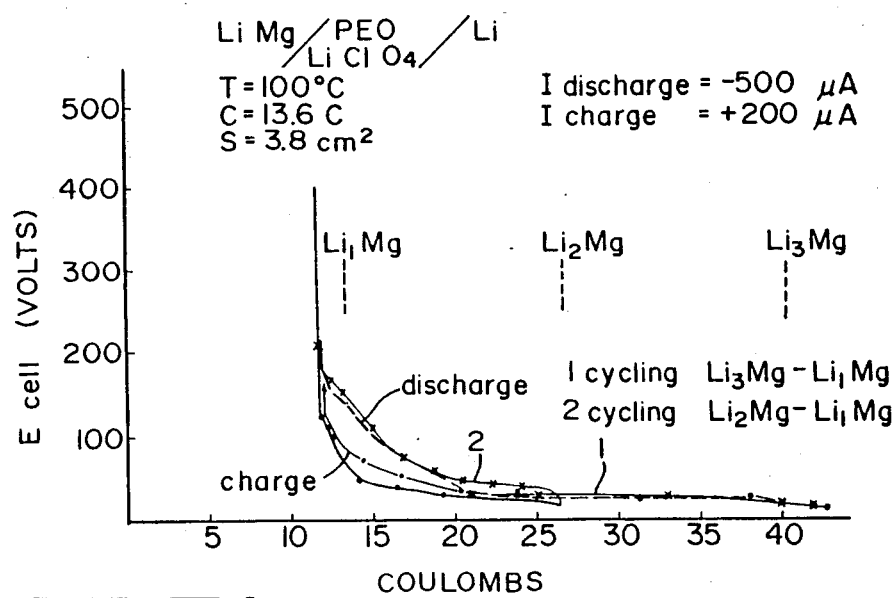
FIG. 4 is a graph describing the first cycle in the case of two electrodes based on magnesium and lithium, the first being cycled between Li$_1$Mg and Li$_2$Mg and the second between Li$_1$Mg and Li$_3$Mg.

FIG. 4 illustrates, in an arrangement equivalent to the one which has just been described, the behaviour to cycling of two compositions of the system LiMg, i.e. Li$_2$Mg and Li$_3$Mg. A good reversibility is obtained between the first and the third lithium (between 50 and 75% at. of lithium in magnesium). This confirms the interest of the dense alloys in the case of magnesium.

Figure 5:
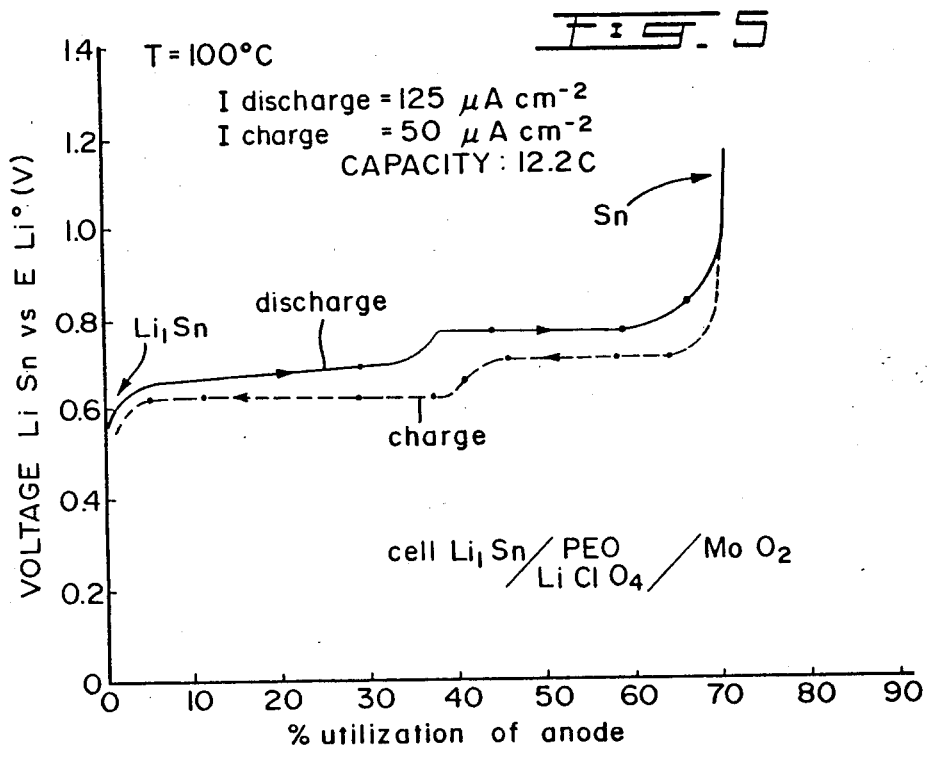
FIG. 5 is a graph describing the behaviour of an alloy of lithium and tin formed in situ containing 1.0 part of lithium (Li$_{1.0}$Sn)
Figure 6:
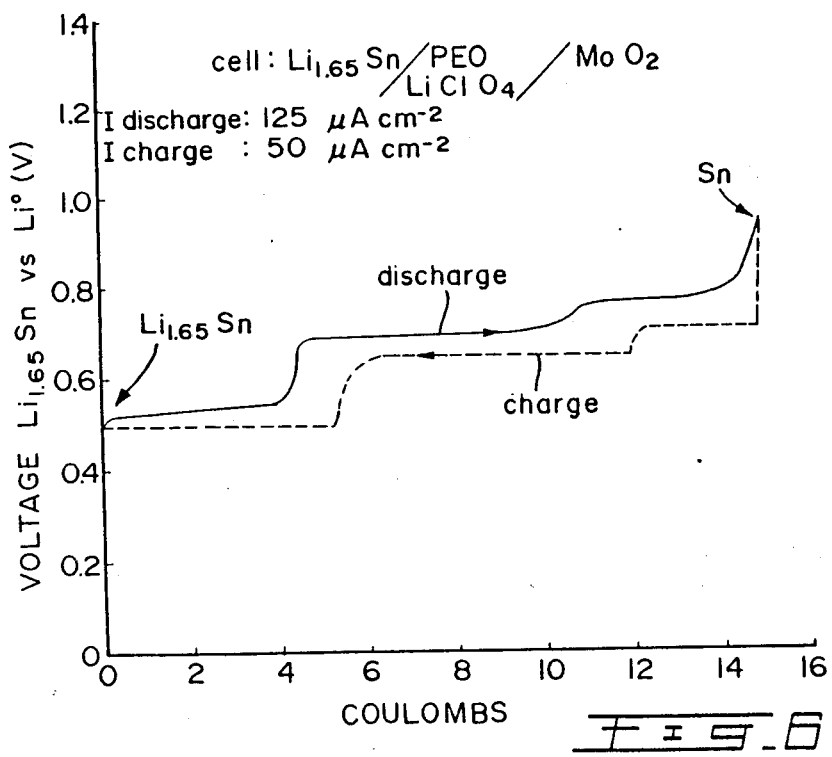
FIG. 6 is a graph describing the behaviour of an alloy of lithium and tin formed in situ containing 1.65 parts of lithium (Li$_{1.65}$Sn)

FIGS. 5, 6 and 7 illustrate the behaviour of LiSn alloys formed in situ respectively corresponding to 1 Sn, 1.65 Sn and 3.2 Sn and obtained by means of the arrangement used above for magnesium. At each concentration a cycling of about ten Coulombs has been carried out and these three tests show the very good reversibility of the various phases of the system Li-Sn. In particular, for the phase Li$_1$Sn more than twenty cycles have been realized showing a stabilized utilization of more than 70% of the content of lithium.

We claim:

1. Dense anode for use in an all solid battery and obtained after charging a battery incorporating said anode comprising a compact metallic foil alloyed with an alkali metal, having a rechargeability on at least 20 cycles and whose thickness varies between 5μ and 100μ.

2. Dense anode according to claim 1, wherein the metallic foil is selected from the group consisting of aluminum, magnesium and tin.

3. Dense anode accordingtto claim 2, wherein the metallic foil is alloyed with lithium.

4. Dense anode according to claim 3, wherein the metallic foil comprises aluminum.

5. Dense anode according to claim 3, wherein the metallic foil comprises tin.

6. Dense anode according to claim 3, wherein the metallic foil comprises magnesium.

7. Dense anode according to claim 1, wherein the metallic foil is mounted on a collector.

8. Dense anode according to claim 7, wherein the collector is a thin conducting foil, which is inert with respect to the alloy.

9. Dense anode according to claim 8, wherein the collector comprises a copper foil.

10. Dense anode according to claim 8, wherein the collector comprises a foil of metallized plastic.

11. Dense anode according to claim 8, wherein the collector comprises a metal grid.

12. Dense anode according to claim 1, wherein the alkali metal fills the interstices present in the metallic foil before formation of the alloy.

13. Dense anode according to claim 4, wherein the foil of alloyed aluminum comprises 30 to 40% at. lithium.

14. Dense anode according to claim 5, wherein the foil of tin comprises a positive amount of up to 76% at. lithium.

15. Dense anode according to claim 6, wherein the foil of magnesium comprises 50 to 70% at. lithium.

* * * * *

UNITED STATES PATENT AND TRADEMARK OFFICE
CERTIFICATE OF CORRECTION

PATENT NO.   :   4,794,060
DATED        :   Dec. 27, 1988
INVENTOR(S)  :   Andre BELANGER et al.

It is certified that error appears in the above-identified patent and that said Letters Patent is hereby corrected as shown below:

On the Title Page, Item [73]:

The second Assignee, SOCIETE NATIONALE ELF AQUITAINE, is located in Paris, France, not in Quebec, Canada.

Signed and Sealed this

Twentieth Day of June, 1989

*Attest:*

DONALD J. QUIGG

*Attesting Officer*   *Commissioner of Patents and Trademarks*